United States Patent [19]
Ziegler et al.

[11] Patent Number: 6,158,021
[45] Date of Patent: Dec. 5, 2000

[54] METHOD OF CHECKING THE OPERABILITY OF A PROCESSOR

[75] Inventors: Herbert Ziegler, Rain; Richard Merl, Schwandorf; Horst Jouvenal, Wiernsheim; Dietmar Peters, Regensburg; Johann Schmid, Cham, all of Germany

[73] Assignee: Siemens Aktiengesellschaft, Munich, Germany

[21] Appl. No.: 09/137,317

[22] Filed: Aug. 20, 1998

Related U.S. Application Data

[63] Continuation of application No. PCT/DE97/02830, Dec. 3, 1997.

[30] Foreign Application Priority Data

Dec. 20, 1996 [DE] Germany .......................... 196 53 429

[51] Int. Cl.[7] .................................................. G06F 11/00
[52] U.S. Cl. .......................................... 714/25; 364/228.3
[58] Field of Search ............................... 714/25, 2, 8, 10, 714/11, 30, 31, 32, 35, 47, 724, 733, 736, 742, 13, 27, 39, 48; 395/575; 364/228.3, 230, 230.4

[56] References Cited

U.S. PATENT DOCUMENTS

| | | | |
|---|---|---|---|
| 4,456,952 | 6/1984 | Mohrman et al. | 364/200 |
| 4,460,999 | 7/1984 | Schmidt | 371/21 |
| 4,758,948 | 7/1988 | May et al. | 364/200 |
| 5,043,984 | 8/1991 | Tomisawa et al. | 371/16 |
| 5,136,595 | 8/1992 | Kimura | 371/68.3 |
| 5,406,504 | 4/1995 | Denisco et al. | 364/580 |
| 5,410,685 | 4/1995 | Banda et al. | 395/575 |
| 5,557,558 | 9/1996 | Daito | 364/579 |
| 5,581,739 | 12/1996 | FitzPatrick | 395/500 |
| 5,623,497 | 4/1997 | Shimawaki et al. | 371/5.1 |
| 5,657,330 | 8/1997 | Matsumoto | 371/22.5 |
| 5,732,209 | 3/1998 | Vigil et al. | 395/183.06 |
| 5,805,797 | 9/1998 | Sato et al. | 395/185.01 |
| 5,948,111 | 9/1999 | Taylor et al. | 714/10 |

FOREIGN PATENT DOCUMENTS

| | | |
|---|---|---|
| 0082722A2 | 12/1982 | European Pat. Off. . |
| 0154551A2 | 9/1985 | European Pat. Off. . |
| 4114999a1 | 11/1992 | Germany . |

OTHER PUBLICATIONS

"Mikroprozessor Selbsttest" (Microprocessor selt test), B. Ebel, Elektronische Rechenanlagen, 1978, vol. 20, No. 4, pp. 186–194.

"Topological Analysis of Packet Networks", Vikram Sasenka, IEEE Journal on Selected Areas in Communications, vol. 7, No. 8, Oct. 8, 1989.

"Establishing Virtual Circuits in Large Computer Networks", Alan Baratz et al., Elsevier Science Publishers B.V. (North–Holland), pp. 27–37.

"A New HAD Algorithm for Optimal Routing of Hierarchically Structured Data Networks", Garng Huang et al., IEEE, 1995, pp. 594–601.

"Topology Aggregation for Hierarchical Routing in ATM Networks", Whay Lee, Computer Communication Review, pp. 82–91.

*Primary Examiner*—Nadeem Iqbal
*Attorney, Agent, or Firm*—Herbert L. Lerner; Laurence A. Greenberg; Werner H. Stemer

[57] ABSTRACT

The proper functionality of a first processor is checked with a second processor. The second processor thereby provides the first processor with a start value and a computation rule. The first processor carries out the specified computation rule using the predetermined start value, and returns a result to the second processor. The second processor checks the result against a stored comparison result. The computation rule is defined such that the basic instructions which are used for programming the first processor are checked.

11 Claims, 4 Drawing Sheets

FIG.3

|  | COMPUTATION 0 | COMPUTATION 1 | COMPUTATION 2 | COMPUTATION 3 |
|---|---|---|---|---|
| ARITHMETIC INSTRUCTIONS | ADD<br>MUL<br>CPL<br>SUBB<br>DIVL | ADDCB<br>DIV<br>CPLB<br>SUBC | SUB<br>MULU<br>NEGB<br>ADDB<br>DIVU | SUBCB<br>DIVLU<br>NEG<br>ADDC |
| LOGIC INSTRUCTIONS | ANDB<br>XOR | OR | ORB<br>BXOR | AND<br>XORB |
| BITSET INSTRUCTIONS | BSET<br>BAND | BCLR<br>BOR | BMOV<br>BFLFL | BMOVN<br>BCMP<br>BFLDH |
| COMPARE | CMPB | CMP | CMP12 | CMPD1 |
| SHIFT | SHR | SHL<br>ASHR | ROR | ROL |
| TRANSFER | MOV | MOVB | MOVBZ | MOVBS |
| JUMP | JMPA<br>JNB | JMPR<br>JNBS | JB | JBC |

FIG.4

| START VALUE | RESULT 0 | RESULT 1 | RESULT 2 | RESULT 3 |
|---|---|---|---|---|
| 0 | 155C | B246 | 09BE | E037 | E592 |
| 1 | DFDB | ACCD |  |  |  |
| 2 |  |  |  |  |  |
| 3 |  |  |  |  |  |
| 4 |  |  |  |  |  |
| 5 |  |  |  |  |  |
| 6 |  |  |  |  |  |
| 7 |  |  |  |  |  |
| 8 |  |  |  |  |  |
| 9 |  |  |  |  |  |

METHOD OF CHECKING THE OPERABILITY OF A PROCESSOR

CROSS-REFERENCE TO RELATED APPLICATION

This is a continuation of copending International Application PCT/DE97/02830, filed Dec. 3, 1997, which designated the United States.

BACKGROUND OF THE INVENTION

Field of the Invention

The invention relates to a method of checking the operability of a computing processor by means of a second processor which provides to the first processor a computation rule and a start value. The first processor uses the start value and the computation rule to calculate a result and transfers the result to the second processor, which compares the result with a comparison result.

Methods for monitoring the operability or functionality of a processor are used, in particular, in motor vehicle engineering where the processor controls a safety-related motor vehicle function. For example, the control system for the cruise control or the control system for the throttle valve position is safety-related. The processor which controls the cruise control or the throttle valve position should thus be checked for proper operation.

German published non-prosecuted patent application DE 44 38 714 A1 discloses a method for controlling a drive unit in a vehicle. There, a computation element is provided for carrying out control functions and monitoring functions for power control. The computation element is split into three independent levels. The first level carries out the control of the power, the second level monitors that the control process is carried out, and the third level monitors the operation of the second level.

The second level monitors the control function for controlling the throttle valve by comparing values derived from pre-set values and setting values for the power.

SUMMARY OF THE INVENTION

It is accordingly an object of the invention to provide a method of checking the functionality of a processor, which overcomes the disadvantages of the prior art devices and methods of this general type and which allows for a reliable identification of faults and errors.

With the foregoing and other objects in view there is provided, in accordance with the invention, a method of checking the operability of a first processor, which comprises:

providing a computation rule and a start value to a first processor with a second processor, the computation rule being an instruction from an instruction set used by the first processor for processing a program or a computation rule;

calculating a result from the start value and the computation rule in the first processor and transferring the result to the second processor;

comparing the result with a comparison result in the second processor and deducing that the first processor is properly operable if the comparison step leads to an acceptable result.

In accordance with an added feature of the invention, the computation rule is defined with at least one instruction from the instruction set with an arithmetic instruction, a logic instruction, a bit set instruction, a comparison instruction, a shift instruction, a transfer instruction, and a jump instruction.

In accordance with another feature of the invention, the second processor provides cyclically different computation rules and different start values to the first processor.

In accordance with an additional feature of the invention, the different computation rules have different instructions for a same type of instruction.

In accordance with a further feature of the invention, the method comprises the following steps which follow the above noted comparing step:

if a result calculated by the first processor does not match the corresponding comparison result, supplying an error signal from the second processor to the first processor and incrementing an error counter with the first processor by a predetermined value on receipt of the error signal;

if a result is correct, supplying a response signal from the second processor to the first processor and decrementing the error counter with the first processor by the predetermined value on receipt of the response signal;

checking the decrementing of the error counter with the second processor, and passing an alarm signal from the second processor to the first processor if the first processor does not decrement the error counter when a response signal occurs.

In accordance with again another feature of the invention, the instruction set is a machine instruction set of a microcontroller, and preferably an assembler instruction set.

In accordance with again a further feature of the invention, the computation rule is defined as a sequence of instructions, and a result of a first instruction or a condition bit of the first instruction is taken into account in processing a second instruction.

In accordance with again an additional feature of the invention, the sequence of instructions is processed successively, the first instruction being processed with the start value, a result of the first instruction being used as the start value for the second instruction, and a result of the second instruction being passed to the second processor as a final result.

In accordance with a concomitant feature of the invention, at least one condition bit of an instruction being processed is checked for a correct value while the first processor is being checked for its operability.

A major advantage of the invention is that basic functions which a processor uses for processing functions are checked.

Other features which are considered as characteristic for the invention are set forth in the appended claims.

Although the invention is illustrated and described herein as embodied in a method of checking the operability of a processor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is an instruction table;

FIG. 4 is a result table;

DESCRIPTION OF THE PREFERRED EMBODIMENTS

Figure 1:
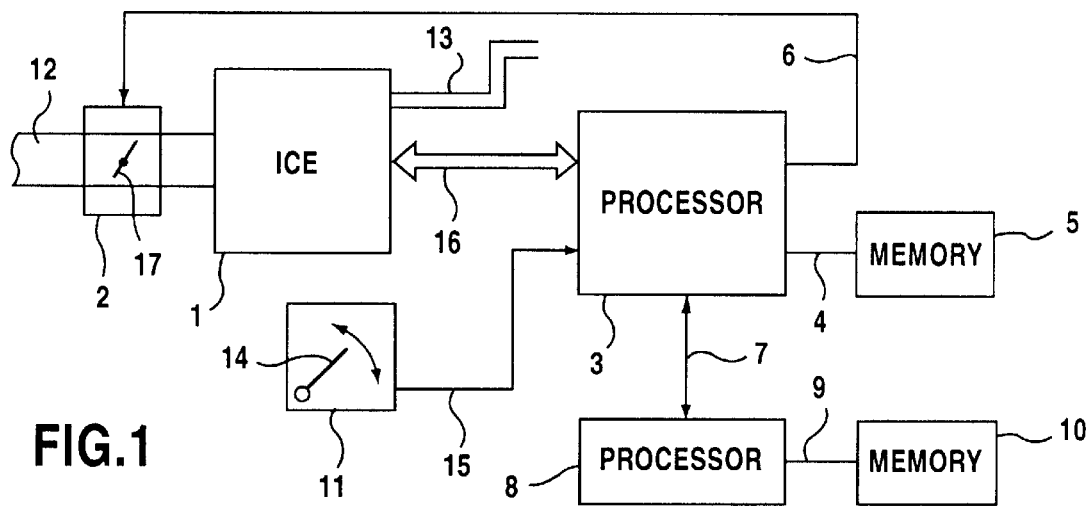
FIG. 1 is a schematic layout of a motor vehicle with a controller.

Referring now to the figures of the drawing in detail and first, particularly, to FIG. 1 thereof, there is seen a controller for an internal combustion engine (ICE) 1 having an injection system which has an intake manifold 12 in which a throttle valve 17 is disposed. The throttle valve 17 is controlled by an associated throttle valve controller 2. The internal combustion engine 1 furthermore has an exhaust manifold 13 where exhaust gases are ejected. Furthermore, a gas pedal 14 is provided, whose position is determined by a gas pedal sensor 11.

The gas pedal sensor 11 is connected via a sensor line 15 to a first processor 3, which is connected via a control line 6 to the throttle valve controller 2, via a first data line 4 to a first memory 5, via a first databus 16 to the internal combustion engine 1, and via a second databus 7 to a second processor 8. The second processor 8 is connected via a second data line 9 to a second memory 10.

The method according to the invention will be described in the following text using the example of power control of an internal combustion engine 1, in which the power of the internal combustion engine is adjusted via the position of the throttle valve 17.

The power desired by the driver is indicated by appropriate operation of the gas pedal 14. The position of the gas pedal 14 is measured by the gas pedal sensor 11 and is passed on to the first controller 3. The first controller 3 then converts the driver's wish into a corresponding drive level for the throttle valve controller 2, which adjusts the throttle valve 17 in an appropriate manner.

The first processor 3 takes account of parameters relating to the internal combustion engine 1, which are fed to the first processor 3 via the first databus 16, and uses calculation and control functions which are stored in the first memory 5 to calculate from the driver's wish the drive signal by means of which the throttle valve controller 2 is driven. Parameters from the environment, such as the outside temperature or the humidity for example, are preferably taken into account.

The correct operation of the first processor 3 is checked by the second processor 8 by means of a data interchange via the second databus 7, the second processor 8 accessing data which are stored in the second memory 10.

Figure 2:
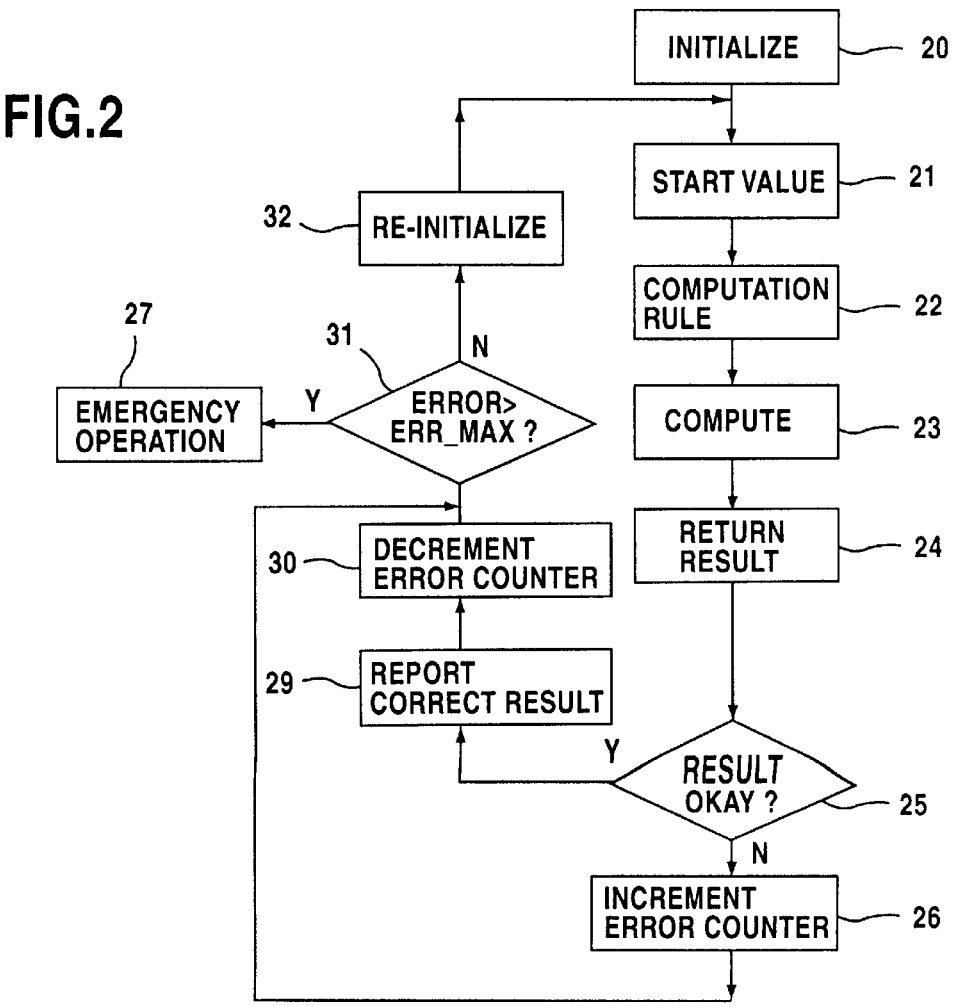
FIG. 2 is a flow chart showing a schematic program sequence.

FIG. 2 shows a schematic method by means of which correct operation of the first processor 3 is checked by the second processor 8.

After the power supply is switched on, an initialization is carried out in program item 20. During the initialization, predetermined initial parameters are read from the first and second memories 5, 10.

Subsequently, in program item 21, the second processor 8 supplies a start value to the first processor 3. In program item 22, the second processor 8 then gives the first processor 3 a computation rule.

After receiving the start value and the computation rule, the first processor 3 processes the predetermined computation rule using the predetermined start value, in program item 23. In program item 24, the first processor 3 passes to the second processor 8 the result calculated from the predetermined computation rule and the predetermined start value.

The second processor 8 compares the result supplied from the first processor 3 with a comparison result, which is stored in the second memory 10 as a function of the predetermined start value and the predetermined computation rule. If the comparison in program item 25 indicates that the result and the comparison result match, then the program branches off to program item 29.

However, if the comparison in program item 25 indicates that the result and the comparison result do not match, then, in program item 26, an error counter is incremented by the value 1 by the second processor 8. Once program item 26 has been processed, the program branches to program item 31.

In program item 29, the second processor 8 passes the information to the first processor 3 that the result supplied matches the comparison result. The second processor 8 then checks the error counter and decrements the value of the error counter in program item 30, provided this value is greater than zero.

In program item 31, the value of the error counter (ERROR) is then compared by the second processor 3 with a maximum value (ERR_MAX). If the comparison indicates that the error counter is above the predetermined maximum value (ERR_MAX), then, in the subsequent program item 27, the first processor 3 is switched by the second processor 8 to an emergency running function, in which the internal combustion engine 1 can now be controlled only within predetermined, limited power ranges so that any hazard is limited as far as possible, although it is still possible to reach the nearest garage.

A development of the invention is achieved by the following function: the second processor 8 supplies the first processor 3 with an error signal if the result calculated by the first processor 3 does not match the corresponding, stored comparison result. On receipt of an error signal, the first processor 3 increments the error counter by the value 1. If the result is correct, the second processor 8 supplies the first processor 3 with a response signal. The first processor 3 then decrements the error counter by the value 1 on receipt of a response signal. The second processor 8 checks the decrementing of the error counter and passes an alarm signal to the first processor 3 if the first processor 3 does not decrement the error counter when a response signal occurs. When an error signal occurs, the first processor 3 goes to an emergency operation, in which only limited power control is possible.

However, if the question asked in program item 31 indicates that the error counter is less than the predetermined maximum value, then the program branches to program item 32.

In program item 32, the second processor 8 chooses from the second memory 10 another start value and/or another computation rule which is then given to the first processor 3, in program item 21 and in program item 22. If the error counter is not equal to zero, then the second processor 8 preferably chooses the same computation rule for the next test program and, preferably, the same start value with which the incorrect result was calculated by the first processor 3. The same computation rule continues to be used until the error is overcome or the first processor 3 has switched to an emergency running function.

FIG. 3 shows a table in which, as in the example, the instruction set of the first processor 3 is quoted, by means of which the first processor 3 processes programs and/or calculations. The instructions in the instruction set are in this case associated with four different computation rules, which are designated computation 0, computation 1, computation 2 and computation 3. The instruction types in the instruction set comprise arithmetic instructions, logic instructions, bit set instructions, comparison instructions, shift instructions, transfer instructions and jump instructions.

Each computation rule preferably contains at least one arithmetic instruction, one logic instruction, one bit set instruction, one comparison instruction, one shift instruction, one transfer instruction and one jump instruction. The computation table illustrated in FIG. 3 is stored in the first memory 5.

FIG. 4 shows a result table which shows the result of the computation rules for computation 0 to computation 3 as a function of the start value. The result of FIG. 4 is obtained by the first processor 3 when the computation rule is processed correctly. In this case, the designation result 0, result 1, result 2 and result 3 denote the result of computation 0, computation 1, computation 2 and computation 3.

FIG. 4 shows, for a start value 0, which corresponds to a hexadecimal value of 155C, the result 0 of the computation 0 with a hexadecimal value of B246.

If the computation 1 is carried out by the first processor 3 using the start value 155C, then, if the processor 3 is operating correctly, the result 1 with the hexadecimal value 09BE must be obtained.

In the case of a start value with the hexadecimal value DFDB, the first processor 3 when processing computation 0 must obtain the result 0 with the hexadecimal value of ACCD if the first processor 3 is working correctly.

The computation rules shown in FIG. 3 represent preferred computation rules. In simple cases, a computation rule comprises only at least one instruction from the instruction set for the processor to be tested.

The instructions shown as an example in FIG. 3 are assembler instructions. When the computation rules are being programmed in the processor 3, the computation rules should be programmed directly in the appropriate machine language since this is the only way in which the exact instruction set is defined. In the case of the example of the assembler instruction set, the computation rules 0 to 3 should be programmed in assembly language.

The computation 0 should be understood to mean that, with the start value predetermined by the second processor 8, the assembler instructions in the computation 0 column are carried out from top to bottom. For computation 0, this means that, starting from the value 0, the start value is added (ADD) and the hexadecimal value 155C is obtained as a result. The result is then multiplied by the start value (MUL). In this way, all assembler instructions in computation 0 are processed successively in such a manner that the result of the preceding assembler instruction is used once again for the next assembler instruction. In the event of a malfunction, each assembler instruction thus makes a contribution to the final result.

If all the instructions in computation rule 0 have been processed, then the last result, that is to say the final result which is obtained after the jump instruction JNB, is supplied to the second processor 8 as the result, in program item 24.

In this exemplary embodiment, assembler instructions have been quoted which are preferably checked for correct operation individually or, as illustrated in the computation rules in FIG. 3, a plurality of assembler instructions are checked for correct operation.

If other machine instructions, that is to say the instruction set for processor 3, are used for programming, then they are checked with the aid of an appropriate computation rule, in order to check the correct operation of the first processor 3.

A machine instruction is used to denote instructions which represent the smallest predetermined instructions, in a programming language which is used to create the program, such as the individual assembler codes, for example, when using the assembler language.

The essential advantage of the invention is that the instructions in the instruction set, preferably all the instructions in the instruction set, with which the first processor 3 processes or can process a program or a calculation, are checked for correct operation individually or as a group with a plurality of instructions in one test calculation.

Preferably, instruction chains are checked which have at least one instruction from the various types of possible instructions, so that the various instruction types are checked by a single computation rule.

In the following text, an example which comprises only a few instructions in an instruction set, in this case in the assembler code for the processor 3 are used to illustrate the principle of function monitoring. As many of the instructions as possible (preferably all the instructions) are checked using test calculations in order to monitor the operability of the processor 3.

Figure 5:
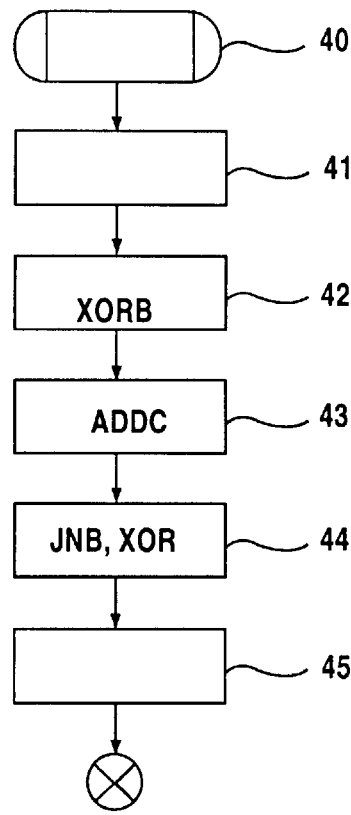
FIG. 5 is a flow chart of a program sequence.

FIG. 5 shows in summary form the calculation of a computation rule which comprises the assembler instructions XORB, ADDC, JNB and XOR. The assembler instructions are described, for example, in the Instruction Set Manual for the 16 bit CMOS single-chip microcontroller from Siemens.

In program item 40, the computation rule is started similarly to the program item 23 in FIG. 2. First of all, in program item 41, the memory location at which the result of the computation rule is stored is loaded with an error value. This initial loading has the advantage that, in the event of termination of the computation rule, the result is loaded with an error result so that termination on the basis of the result is identified as an error.

Figure 6:
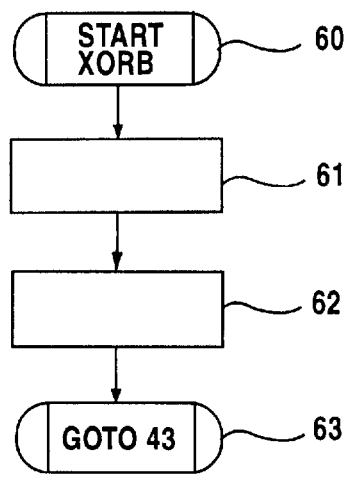
FIG. 6 is a flow chart of a first subroutine.

The assembler instruction XORB is then carried out in program item 42. The way in which this instruction is carried out is shown in more detail in FIG. 6. The assembler instruction XORB represents a logic exclusive OR operation in which a logic, exclusive OR operation between a first value and a second a value is carried out bit-by-bit, and the result is stored as a new first value: W1=XORB (W1, W2), where W1 is the first value and W2 is the second value.

During the processing of computation rules, like the assembler instructions, condition bits are also provided as well as the result and provide further information about the processing of the computation rule. In the example of the 16-bit CMOS single-chip microcontroller, five condition bits are provided which are loaded with different values depending on the result of the assembler instruction carried out. The five condition bits are stored in a bit register and are referred to in the following text as the E Bit, Z Bit, V Bit, C Bit and N Bit. The N Bit has the value 1 when the most significant bit in the result is set. The N Bit is set to the value 0 when the most significant bit in the result is not set.

The C Bit has the value 1 when an overflow occurs at the most significant bit position. The C Bit has the value 0 when no overflow occurs during the processing of the assembler instruction. The V Bit has the value 1 when an arithmetic overflow occurs during the processing of the assembler instruction. The V Bit has the value 0 when no arithmetic overflow occurs during the processing of the assembler instruction. The Z Bit has the value 1 when the result of the assembler instruction has the value 0. The Z Bit has the value 0 when the result of the assembler instruction does not have the value 0. The E Bit has the value 1 when the second value (W2) represents the smallest negative number, otherwise the E Bit has the value 0. The V Bit and the C Bit are always set to 0 for the assembler instruction XORB.

The processing of the assembler instruction XORB starts in program item 60, a start value from the table in FIG. 4 being used as the first value. The start value is supplied by the second processor 8 to the first processor 3. If the start value is a 16-bit long data word, then only the HIGH byte of the start value, that is to say the eight most significant bits, is used for carrying out the assembler instruction XORB.

The value of a predetermined mask, which filters eight bits out of the start value, is used as the second value (W2). In the exemplary embodiment, the mask that is used is composed of the eight least significant bits of the start value.

After carrying out the computation operation XORB, the result is stored, in program item 61, as an intermediate result in a temporary register. Then, in program item 62, the intermediate result stored in program item 61, plus the value of the bit register is stored as the new intermediate result, the condition bits, which are not influenced by the assembler instruction XORB, having been loaded with the value 0:

$$ZW = ZW + (\text{bit register})$$

The program then makes a jump, in program item 63, back to program item 43 in FIG. 5.

In program item 43, the assembler instruction ADDC is tested, which carries out an integer addition taking account of the carry bit, that is to say the C Bit:

$$ADDC(W1, W2) = W1 + W2 + C \text{ Bit.}$$

The ADDC assembler instruction carries out a binary addition of the two's complement of the second value and of the first value, the C Bit which is produced in the last computation step also being added. The result of the ADDC computation operation is stored as a new first value W1:

$$W1 = ADDC (W1, W2).$$

Figure 7:
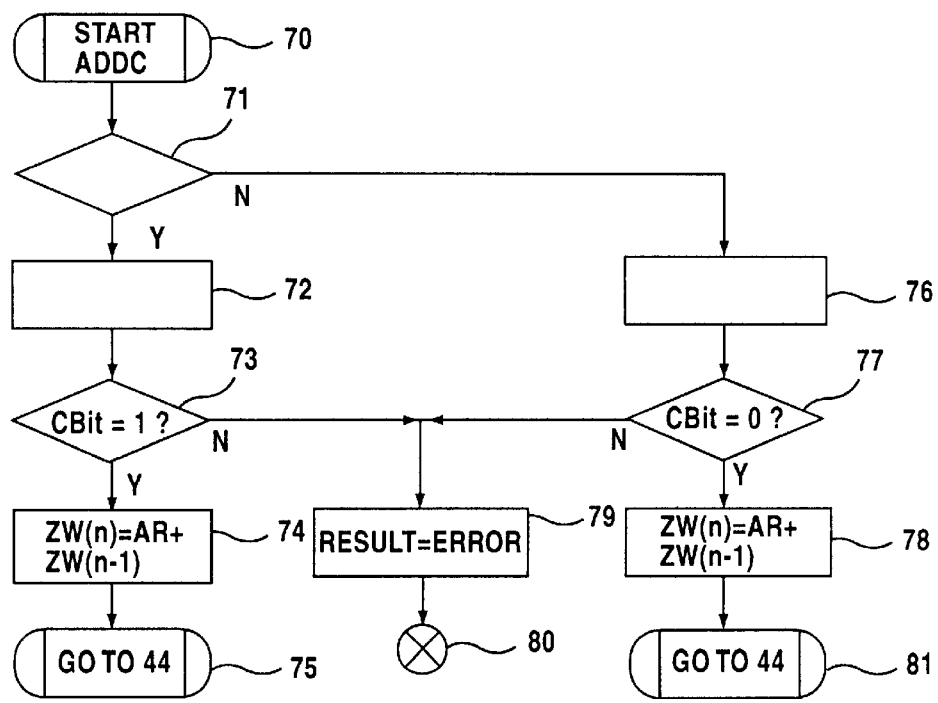
FIG. 7 is a flow chart of a second subroutine.
Figure 8:
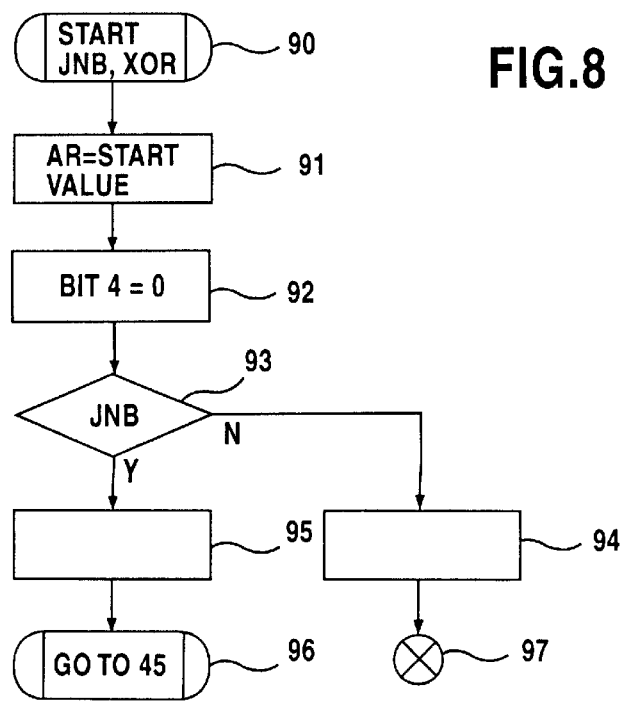
FIG. 8 is a flow chart of a third subroutine.

The processing of the test calculation of the ADDC computation operation is explained in more detail in FIG. 7. A branch is made from program item 43 to program item 70, in which the test calculation for the ADDC computation operation is started. A check is carried out in program item 71 to determine whether the fifteenth bit in the start value which is taken from the table in FIG. 4 has the value 1. If this is the case, then the program branches to program item 72. In program item 72, a working register AR is loaded with the result of the ADDC computation operation, the start value being used in each case as the first value and as the second value:

$$AR = ADDC (W1, W1) = ADDC (\text{start value, start value}).$$

A check is then carried out in program item 73 to determine whether the C Bit for the ADDC instruction carried out has the value 1. If this is the case, the sum of the working register AR and the previous intermediate result ZW(n−1) is then stored, in program item 74, as the new intermediate result ZW(n):

$$ZW(n) = AR + ZW(n-1).$$

In program item 75, the program then branches back to program item 44 in FIG. 5.

If the question asked in program item 73 indicates that the C bit does not have the value 1, then the program branches to program item 79, in which an error value is stored as the result and the test calculation is then ended in program item 80.

If the question asked in program item 71 indicates that the fifteenth bit of the start value does not have the value 1, then the program branches to program item 76. After program item 76, the value of the computation operation ADDC is stored in the working register AR, the start value being used in each case as the first value and as the second value:

$$AR = ADDC (\text{start value, start value}).$$

The C bit of the ADDC instruction is then checked in program item 77. If the C Bit has the value 0, then the program branches to program item 78. In program item 78, the sum of the value of the working register and the value of the previous intermediate result ZW(n−1) is stored as the new intermediate result ZW(n):

$$ZW(n) = AR + ZW(n-1).$$

In program item 81, the program then branches back to program item 44 in FIG. 5.

If the question asked in program item 77 indicates that the C Bit does not have the value 0, then the program branches to program item 79. In program item 79, an error value is stored as the result, and the test calculation is then ended in program item 80.

The test calculation for program item 44 comprises the assembler instructions JNB and XOR. The assembler instruction JNB represents a conditional jump instruction which is carried out when a predetermined bit has the value 0. In order to determine which instruction is intended to be carried out next, an instruction pointer is used, which points at a current address at which the instruction to be carried out next is stored.

If the jump instruction JNB is carried out, then the instruction pointer is shifted by a predetermined number of addresses, as determined by the second value W2. However, if the predetermined bit has the value 1, then the instruction which is stored at the current address is carried out as the next instruction.

The XOR computation operation represents a logic, exclusive OR operation between a first value W1 and a second value W2: XOR (W1, W2). The result of the XOR computation operation is stored as a new value W1:

$$W1 = XOR (W1, W2).$$

The program branches from program item 44 to program item 90, in which the test calculation for the JNB and XOR instruction is started. In program item 91, the temporary working register AR is loaded with the predetermined start value from the table in FIG. 4: AR=start value.

In program item 92, the fourth bit in the working register is then loaded with the value 0. The JNB instruction is then carried out in program item 93, with the fourth bit of the working register AR being used as the first value W1. The second value W2 is designed such that the instruction pointer jumps to a new address at which an error routine is stored as the instruction. If carrying out the JNB instruction now results in the fourth bit of the working register not being 0, then the program branches to program item 94 in accordance with the predetermined second value W2, in which program item 94 the error routine is started, in which the memory for the result is loaded with an error value, and the program is then ended in program item 97.

However, if the question asked in program item 93 indicates that the fourth bit has the value 0, then the program branches to program item 95. In program item 95, the result of the XOR computation operation with the previous intermediate result ZW(n−1) as the first value W1 and the working register AR as the second value W2 is stored as the new intermediate result ZW(n):

$$ZW(n)=XOR\ (ZW(n-1),AR).$$

In program item 96, the program then branches back to program item 45.

In program item 45, the first processor 3 passes, similarly to the program item 24 in FIG. 2, the result to the second processor 8, which compares the result with a comparison result and identifies a malfunction in the first processor 3 if the result does not match the comparison result, preferably with a predetermined relationship. The program is then ended.

The start values used in FIG. 5 are preferably always the same start value from the table in FIG. 4 which is associated with the corresponding computation rule.

The check of a plurality of instructions in an instruction chain, in which the result of an instruction is used once again for the following instruction, offers the advantage that each instruction contributes to the final result and thus relatively small inaccuracies in individual instructions are also reinforced in this way and hence lead to a noticeable error in the sum in the final result, which error makes it possible to deduce a malfunction in the processor.

A simple check of the first processor 3 when processing an instruction is to check for the correct value or the correct change of at least one condition bit in this instruction. If a condition bit is incorrect, it is possible to deduce that there is a malfunction in the first processor 3. The condition bits in the first processor 3 are checked either by the first or the second processor 3, 8.

We claim:

1. A method of checking the operability of a first processor, which comprises:
   providing a computation rule and a start value to a first processor with a second processor, the computation rule being an instruction from an instruction set used by the first processor for processing a program or a computation rule;
   calculating a result from the start value and the computation rule in the first processor and transferring the result to the second processor;
   comparing the result with a comparison result in the second processor and deducing that the first processor is properly operable if the comparison step leads to an acceptable result.

2. The method according to claim 1, which comprises defining the computation rule with at least one instruction selected from the instruction set with the group of instructions consisting of an arithmetic instruction, a logic instruction, a bit set instruction, a comparison instruction, a shift instruction, a transfer instruction, and a jump instruction.

3. The method according to claim 1, which comprises providing, with the second processor, cyclically different computation rules and different start values to the first processor.

4. The method according to claim 3, wherein the different computation rules have different instructions for a same type of instruction.

5. The method according to claim 1, which comprises, subsequently to the comparing step:
   if a result calculated by the first processor does not match the corresponding comparison result, supplying an error signal from the second processor to the first processor and incrementing an error counter with the first processor by a predetermined value on receipt of the error signal;
   if a result is correct, supplying a response signal from the second processor to the first processor and decrementing the error counter with the first processor by the predetermined value on receipt of the response signal;
   checking the decrementing of the error counter with the second processor, and passing an alarm signal from the second processor to the first processor if the first processor does not decrement the error counter when a response signal occurs.

6. The method according to claim 1, wherein the instruction set is a machine instruction set of a microcontroller.

7. The method according to claim 6, wherein the instruction set is an assembler instruction set.

8. The method according to claim 1, which comprises defining the computation rule as a sequence of instructions, and taking into account a result of a first instruction or a condition bit of the first instruction in processing a second instruction.

9. The method according to claim 8, which comprises processing the sequence of instructions successively, processing the first instruction with the start value, using a result of the first instruction as the start value for the second instruction, and passing a result of the second instruction to the second processor as a final result.

10. The method according to claim 1, which further comprises checking at least one condition bit of an instruction being processed for a correct value, while the first processor is being checked for its operability.

11. A method of checking the operability of a first processor, which comprises:
    providing one of a plurality of computation rule and one of a plurality of start values to a first processor with a second processor, the computation rules being an instruction from an instruction set used by the first processor for processing a program or a computation rule;
    calculating a result from the start value and the computation rule in the first processor and transferring the result to the second processor;
    comparing the result with a comparison result in the second processor and increasing an error counter if the comparison step does not lead to an acceptable result;
    providing to the first processor the same computation rule and start value with which the first processor calculated the result if the comparison step does not lead to an acceptable result.

* * * * *